United States Patent
Levin et al.

(10) Patent No.: US 11,503,059 B2
(45) Date of Patent: Nov. 15, 2022

(54) PREDICTING A NEXT ALERT IN A PATTERN OF ALERTS TO IDENTIFY A SECURITY INCIDENT

(71) Applicant: MICROSOFT TECHNOLOGY LICENSING, LLC, Redmond, WA (US)

(72) Inventors: Roy Levin, Haifa (IL); Mathias Abraham Marc Scherman, Tel Aviv (IL); Yotam Livny, Gadera (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 630 days.

(21) Appl. No.: 16/390,960

(22) Filed: Apr. 22, 2019

(65) Prior Publication Data
US 2020/0336506 A1 Oct. 22, 2020

(51) Int. Cl.
*H04L 29/06* (2006.01)
*H04L 9/40* (2022.01)
*G06F 40/30* (2020.01)
*G06N 3/08* (2006.01)

(52) U.S. Cl.
CPC .......... *H04L 63/1433* (2013.01); *G06F 40/30* (2020.01); *G06N 3/08* (2013.01); *H04L 63/1416* (2013.01)

(58) Field of Classification Search
CPC ............. H04L 63/1433; H04L 63/1416; H04L 63/1425; G06F 40/30; G06N 3/08
See application file for complete search history.

(56) References Cited

U.S. PATENT DOCUMENTS

| | | | | |
|---|---|---|---|---|
| 9,825,989 | B1* | 11/2017 | Mehra | H04L 63/1425 |
| 10,057,283 | B2* | 8/2018 | Mahler | H04L 63/1425 |
| 10,091,229 | B2* | 10/2018 | Stute | H04L 63/1433 |
| 2014/0143863 | A1* | 5/2014 | Deb | H04L 63/1433 |
| | | | | 726/22 |

(Continued)

OTHER PUBLICATIONS

Z. Li, J. Lei, L. Wang and D. Li, "A Data Mining Approach to Generating Network Attack Graph for Intrusion Prediction," Fourth International Conference on Fuzzy Systems and Knowledge Discovery (FSKD 2007), 2007, pp. 307-311, doi: 10.1109/FSKD.2007.15. (Year: 2007).*

(Continued)

*Primary Examiner* — Chau Le
(74) *Attorney, Agent, or Firm* — Newport IP, LLC; Jacob P. Rohwer (57) ABSTRACT

Disclosed herein is a system for predicting, given a pattern of triggered alerts, a next alert in order to identify malicious activity that is about to occur on resource(s) being monitored by a security operations center. A resource can include a server, a storage device, a user device (e.g., a personal computer, a tablet computer, a smartphone, etc.), a virtual machine, networking equipment, etc. Accordingly, the next alert is speculatively triggered in advance and a security analyst can be notified of a pattern of activity that is likely to be malicious. The security analyst can then investigate the pattern of triggered alerts and the speculatively triggered alert to determine whether steps to mitigate the malicious activity before it occurs should be taken.

20 Claims, 6 Drawing Sheets

(56) References Cited

U.S. PATENT DOCUMENTS

| | | | |
|---|---|---|---|
| 2015/0372976 A1* | 12/2015 | Lonas | H04L 63/0227 |
| | | | 726/11 |
| 2016/0044061 A1* | 2/2016 | Forte | H04L 41/22 |
| | | | 715/713 |
| 2018/0150758 A1* | 5/2018 | Niininen | G06N 20/00 |
| 2018/0351783 A1* | 12/2018 | Patrich | H04L 41/0636 |
| 2020/0314118 A1* | 10/2020 | Levin | G06F 21/552 |
| 2020/0336505 A1* | 10/2020 | Neuvirth | H04L 63/1433 |

OTHER PUBLICATIONS

K. Zhang, F. Zhao, S. Luo, Y. Xin and H. Zhu, "An Intrusion Action-Based IDS Alert Correlation Analysis and Prediction Framework, "in IEEE Access, vol. 7, pp. 150540-150551, 2019, doi: 10.1109/ACCESS.2019.2946261. (Year: 2019).*

Bahareth, et al., "Constructing Attack Scenario Using Sequential Pattern Mining with Correlated Candidate Sequences", In the Research Bulletin of Jordan ACM, vol. II, Issue III, Jan. 2013, pp. 102-108.

"International Search Report and Written Opinion Issued in PCT Application No. PCT/US2020/022405", dated May 8, 2020, 26 Pages. (MS# 406030-WO-PCT).

Thanthrige, et al., "Intrusion Alert Prediction Using a Hidden Markov Model", In Repository of arXiv:1610.07276v1, Oct. 24, 2016, 8 Pages.

* cited by examiner

PREDICTING A NEXT ALERT IN A PATTERN OF ALERTS TO IDENTIFY A SECURITY INCIDENT

BACKGROUND

Security is an important aspect for platforms that offer network services. As cloud computing gains popularity, more and more sensitive data and/or services are stored and provided online. Consequently, computer security has become more crucial than ever before. Network providers are especially interested in keeping resources safe to help protect their clients' assets and to avoid legal liability.

In many scenarios, an entity that operates a cloud-based platform uses a security operations center to review potential security issues associated with resources. The resource may be one that the entity controls and/or one that the entity has the responsibility to monitor. The security operations center includes security analysts that investigate the potential security issues in order to determine whether mitigation actions need to be taken to resolve the potential security issues. More specifically, a potential security issue may or may not be a real problem that needs to be mitigated. Consequently, conventional security systems that support the security operations center are configured to pass a potential security issue on to a desk of a security analyst so the security analyst can determine whether the potential security issue is a real problem that needs to be mitigated.

A potential security issue typically arises from a series of smaller actions that form a pattern, and individual ones of these actions can produce different types of alerts. Accordingly, an alert signals that an action, that is possibly associated with malicious activity, has been detected. For instance, a cyberattack may access a first type of resource to maliciously gain access to another type of resource that stores sensitive and confidential information. Consequently, different alerts associated with accessing the first type of resource and/or the other type of resource can be triggered.

Furthermore, the signal strength of an alert, as an indicator of malicious activity, can vary across the different types of alerts. That is, a first alert in a pattern of alerts may not clearly be associated with malicious activity. For instance, in the example of the preceding paragraph, the initial access to the first type of resource may not necessarily result in the sensitive and confidential information being accessed. However, a subsequent alert may more clearly signal the malicious activity. Again, in the example of the preceding paragraph, the subsequent access to the other type of resource exposes the sensitive and confidential information to the cyberattack. In many cases, by the time an alert is triggered, the damage may have already been inflicted via the cyberattack (i.e., an alert is triggered at a time after a malicious action occurs).

It is with respect to these and other considerations that the disclosure made herein is presented.

SUMMARY

The techniques disclosed herein enable systems to predict, given a pattern of triggered alerts, a next alert in order to identify malicious activity that is about to occur. In this way, the next alert is speculatively triggered in advance and a security analyst can be notified of a pattern of activity that is likely to be malicious. The security analyst can then investigate the pattern of triggered alerts and the speculatively triggered alert to determine whether steps to mitigate the malicious activity before it occurs need to be taken. For example, the security analyst can instruct a customer to resolve an issue to prevent the next alert from being triggered. In another example, the security analyst can block access to a particular resource to protect confidential and sensitive data stored therein.

The disclosed system provides a more effective and efficient manner in identifying real security issues before severe consequences are realized (e.g., confidential and/or sensitive data is exposed via a cyberattack). To add a little context, a large number of alerts can be generated for resources of a cloud-based platform being monitored by a security operations center. For example, in a large organization, one security analyst may be tasked with monitoring thousands of servers and/or virtual machines and each of these servers and/or virtual machines may generate one or two alerts per day. Consequently, if the security analyst is required to investigate each alert, the security analyst would need to investigate thousands of alerts in a single day. The system described herein helps use a pattern of already triggered alerts to predict a next alert in the pattern so the system can surface a potential security issue to a security analyst if the predicted next alert is likely to result in a real security issue, or has a chance of resulting in a real security issue.

A potential security issue that is passed on to a security analyst and that is to be analyzed by the security analyst may be referred to as a case. A case can be generated based on triggered alerts and/or predicted next alerts. When alerts result in a case, it means that there is a situation where a resource or a group of resources may be susceptible or exposed to a problem, and therefore, further investigation by a security analyst is warranted. A real security issue that needs to be mitigated may be referred to herein as a security incident (e.g., a cyberattack). A security incident, for example, can be related to distributed denial of service (DDoS) attacks, the installation of malware on a resource, a brute force attack, phishing campaigns, etc.

A resource can include a server, a storage device, a user device (e.g., a personal computer, a tablet computer, a smartphone, etc.), a virtual machine, networking equipment, etc. The resource may be one that is under control of an entity operating a security operations center. Additionally or alternatively, the resource may be one that is configured to be monitored by the security operations center. Alerts can be generated automatically by alert monitoring systems deployed within or in association with the resources. For example, anti-malware software or other detection mechanisms can be configured by a cloud-based platform. In another example, alerts can be generated from external customer reports submitted through a customer portal configured within a cloud-based platform. In further examples, alerts may be manually generated by a user of a device.

As described above, different types of cyberattacks typically include different actions that often trigger a pattern of alerts associated with a resource (e.g., a virtual machine) or a group of resources (e.g., a group of virtual machines in a virtual network). The system described herein learns a model using training data that includes known patterns of triggered alerts and labels indicating a type of cyberattack. The system applies the model to alerts that are received in association with a resource or a group of resources in order to predict a next alert that is likely to be triggered. Consequently, information associated with the next alert, as well as the pattern of triggered alerts, can be displayed in a graphical user interface so it can be reviewed and/or mitigated by a security analyst before further malicious activity actually occurs.

The information displayed to a security analyst can include a description of a type of the predicted next alert that is likely to be triggered, as well as a severity level associated with the predicted next alert. The information can include a probability of the predicted next alert being triggered. Further, the information can include an estimated time or time frame at which the predicted next alert is likely to be triggered (e.g., in an hour, in two days, etc.). Even further, the information can describe the malicious activity known to be associated with the pattern of triggered alerts and the predicted next alert (e.g., a type of security incident). In some examples, the information can include mitigation steps that can help the security analyst resolve a security incident.

The model used to predict an occurrence of the next alert can be any type of predictive model that can be applied to features extracted from a pattern of triggered alerts. In some examples, the features can include information (e.g., words) that identifies a type of alert, a time at which the alert is triggered, a severity level associated with the alert, and/or domain information associated with the alert. A domain can define any type of division of resources that are being monitored by a security operations center. For example, a domain can comprise a particular group of machines, a particular network, a particular service, a particular platform or sub-platform, a particular organization, etc. Accordingly, the domain information can be used to classify a resource that produces the alert and/or a resource on which the detected action occurs. In this way, the domain information can be used to group alerts for pattern identification purposes.

In various embodiments, given a pattern of triggered alerts associated with a resource or a group of resources, the model can be configured to calculate a probability of the predicted next alert being triggered. The system can compare the probability to a probability threshold (e.g., 80%) and display a notification of the speculative occurrence of the predicted next alert to a security analyst for further investigation based on whether the probability satisfies the probability threshold. For instance, if the probability (e.g., 90%) of the predicted next alert being triggered is greater than a probability threshold (e.g., 90%>80%), then the notification of the speculative occurrence of the predicted next alert is displayed to the security analyst for further investigation. In contrast, the system can refrain from displaying the notification of the speculative occurrence of the predicted next alert to the security analyst if the probability (e.g., 70%) of the predicted next alert being triggered is less than or equal to the probability threshold (e.g., 70%≤80%). Using the model, the probability increases as a number of triggered alerts in the pattern of alerts increases. Accordingly, as the number of triggered alerts in the pattern of alerts increases, the model becomes more sensitive to the significance of a predicted next alert.

In further embodiments, the system can determine a severity level associated with a predicted next alert and determine whether the severity level satisfies a severity level threshold (e.g., 7 out of 10). For instance, the system can display a notification of the speculative occurrence of the predicted next alert to a security analyst for further investigation if the severity level (e.g., 8 out of 10) of the predicted next alert is greater than the severity level threshold (e.g., 8>7). In contrast, the system can refrain from displaying the notification of the speculative occurrence of the predicted next alert if the severity level (e.g., 6 out of 10) of the next alert is less than or equal to the severity level threshold (e.g., 6≤7). In this way, a security analyst can devote his or her valuable time to situations with high severity levels and the security analyst is not overwhelmed with issues that have low severity levels.

An alert can include a short description (e.g., a title, a name, etc.) that identifies a type of alert and/or that describes the detected action that may be associated with a potential security issue. Generally, the description includes about one to ten words. Accordingly, in some examples, a pattern of known alerts that is associated with a security issue can be represented by a combination of the words used to describe the alerts (e.g., each alert can be a word and the pattern of known alerts can amount to a sentence or a phrase). The model can be trained to combine the words used in a pattern of triggered alerts and map the combined words to a linguistic context associated with a potential security issue. This type of model (e.g., a "doc2vec" model) may use neural networks and/or natural language processing techniques to produce a vector space that includes a vector representation for the words used in an individual pattern of triggered alerts. The vector representations are positioned, in the vector space, so that patterns of detected alerts that are more likely to share common linguistic contexts, associated with the same security issue, are located in close proximity to one another. Consequently, the model can use vector representations that share a linguistic context in order to predict the next alert (e.g., the next word(s)) that is likely to occur.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for predicting, given a pattern of triggered alerts, a next alert in order to identify malicious activity that is about to occur on resource(s) being monitored by a security operations center. A resource can include a server, a storage device, a user device (e.g., a personal computer, a tablet computer, a smartphone, etc.), a virtual machine, networking equipment, etc. Accordingly, the next alert is speculatively triggered in advance and a security analyst can be notified of a pattern of activity that is likely to be malicious. The security analyst can then investigate the pattern of triggered alerts and the speculatively triggered alert to determine whether steps to mitigate the malicious activity before it occurs should be taken.

Various examples, scenarios, and aspects that effectively predict a next alert based on a pattern of triggered alerts, and displaying information associated with the predicted next alert and the pattern of triggered alerts, are described below with reference to FIGS. 1-6.

Figure 1:
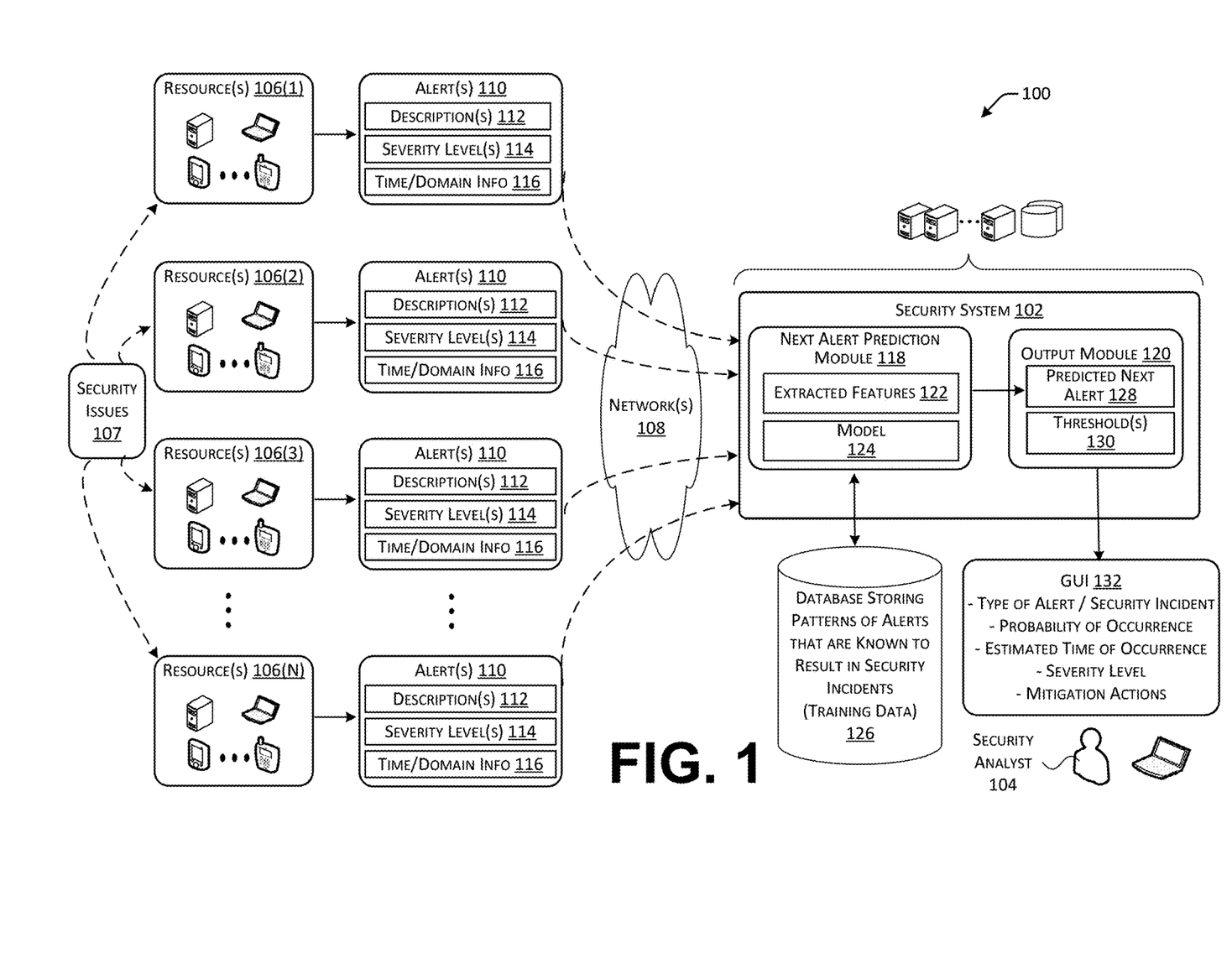
FIG. 1 is a diagram illustrating an example environment in which a security system, supporting a security operations center, is configured to predict a next alert given a pattern of triggered alerts.

FIG. 1 is a diagram illustrating an example environment 100 in which a security system 102, supporting a security operations center, is configured to predict a next alert given a pattern of triggered alerts. The security system 102 is configured to display information about the pattern of the triggered alerts and/or the predicted next alert so that a security analyst 104 can investigate a potential security issue and determine whether mitigation actions should be taken before the predicted next alert is triggered (e.g., before malicious activity occurs or is completed).

FIG. 1 illustrates various resources 106(1)-106(N) (may be referred to herein as resources 106) that may experience potential security issues 107. In the context of FIG. 1, N is a positive integer number that represents different domains to which the resources 106 can belong. A domain can define any type of division of resources that are being monitored by the security system 102 via network(s) 108. For example, a domain can comprise a particular group of machines, a particular network, a particular service, a particular platform or sub-platform, a particular organization, etc. In some instances, a resource can be part of multiple different domains.

As described above, a resource can include a server, a storage device, a user device (e.g., a personal computer, a tablet computer, a smartphone, etc.), a virtual machine, networking equipment, and so forth, that is under control of an entity operating the security system 102. Additionally or alternatively, a resource may be one that is configured to be monitored by the security system 102. Detection mechanisms (e.g., monitoring software) can be used by the security system 102 to generate alerts 110 that can be transmitted to, and received by, the security system 102.

A pattern of alerts 110 can signal the existence of a potential security issue 107 associated with a resource or a group of resources. Alerts 110 can be generated automatically by alert monitoring systems deployed within or in association with the resources. For example, anti-malware software or other detection mechanisms can be configured by a cloud-based platform. In another example, alerts 110 can be generated from external customer reports submitted through a customer portal configured within a cloud-based platform. In further examples, alerts 110 may be manually generated by a user of a resource.

The potential security issue 107 (e.g., a case) can be passed on to a security analyst for further investigation into whether the potential security issue 107 is a real security issue. A real security issue, for example, can be related to distributed denial of service (DDoS) attacks, the installation of malware on a resource, a brute force attack, phishing campaigns, etc.

In one example, a security issue 107 identified via a pattern of triggered alerts 110 can be associated with a cyberattack that attempts to gain access to resources 106 by "cracking" user passwords. An attacker can run programs on its own device to use different methods to access accounts. For instance, the attacker can use brute force attacks to guess the passwords or compare various word combinations against a dictionary file to obtain the passwords. After gaining access to the resources 106, the attacker can perform various malicious actions on the resource 106. In another example, a security issue 107 identified via a pattern of triggered alerts 110 can be associated with a cyberattack that installs malware or other types of malicious software on the resources 106 to instruct the resources 106 to communicate with and execute commands from a network server under the control of an attacker. The compromised resources 106 can cause further damage to uncompromised resources 106 such as collecting sensitive information or distributing spam.

An individual alert 110 can include a description 112 (e.g., title, name, etc.), a severity level 114, and information 116 that describes a time when the alert is triggered and/or a domain in which the alert is triggered. The security system 102 is configured to receive the alerts 110 and/or generate its own alerts. The security system 102 can comprise device(s) (e.g., servers, client devices, etc.) and/or other components that communicate with one another with and/or with the resources 106 via network(s) 108. Moreover, the security system 102 can include a next alert prediction module 118 and an output module 120. The next alert prediction module 118 is configured to extract features 122 from the alerts 110 (e.g., words used in the description, time of occurrence, severity level, and/or a domain) and apply a model 124 to the extracted features 122 to identify a pattern of triggered alerts associated with a resource or a group of resources. The model 124 can then predict the next alert in the pattern.

The number of illustrated modules is just an example, and the number can vary higher or lower. That is, functionality described herein in association with the illustrated modules can be performed by a fewer number of modules or a larger number of modules on one device or spread across multiple devices.

FIG. 1 illustrates a database 126 that stores patterns of alerts associated with resource(s) that are known to result in security incidents. This information stored in the database 126 can be used by the next alert prediction module 118 to train the model 124. In other words, the database stores data representing a patterns of alert, from which features can be extracted, and a label indicating (i) whether a pattern is real security incident and/or (ii) a type of security incident. The next alert prediction module 118 can then apply the model 124 to triggered alerts that are received in association with a resource or a group of resources in order to identify a pattern of triggered alerts and predict a next alert 128 that is likely to be triggered in the pattern.

Once the next alert 128 is predicted, it can be passed to the output module 120 and the output module 120 can access and/or determine information associated with the predicted next alert 128. In some examples, the output module 120 can use threshold(s) 130 to determine whether information is to be displayed to the security analyst 104, as further described herein. The output module 120 can then cause the information to be displayed via a graphical user interface 132 of a device being used by the security analyst 104.

Consequently, information associated with the predicted next alert 128, as well as the pattern of triggered alerts, can be displayed in a graphical user interface 132 so it can be reviewed by a security analyst before further malicious activity actually occurs. The information displayed to the security analyst 104 can include a description of a type of the predicted next alert 128 that is likely to be triggered, as well as the type of security incident (e.g., type of cyberattack). The information can include a probability of the predicted next alert being triggered. The information can include an estimated time or time frame at which the predicted next alert is likely to be triggered (e.g., in an hour, in two days, etc.). The information can include a severity level associated with the predicted next alert. And the information can include mitigation steps that can help the security analyst 104 resolve a security incident.

The model 124 used to predict an occurrence of the next alert 128 can be any type of predictive model that can be applied to features 122 extracted from a pattern of triggered alerts. In various embodiments, given a pattern of triggered alerts 110 associated with a resource or a group of resources, the model 124 can be configured to calculate a probability of the predicted next alert 128 being triggered. Moreover, the output module 120 can compare the probability to a probability threshold (e.g., 80%) and display a notification of the speculative occurrence of the predicted next alert 128 to the security analyst 104 for further investigation based on whether the probability satisfies the probability threshold. For instance, if the probability (e.g., 90%) of the predicted next alert being triggered is greater than a probability threshold (e.g., 90%>80%), then the notification of the speculative occurrence of the predicted next alert is displayed to the security analyst 104 for further investigation. In contrast, the output module 120 can refrain from displaying the notification of the speculative occurrence of the predicted next alert 128 to the security analyst 104 if the probability (e.g., 70%) of the predicted next alert 128 being triggered is less than or equal to the probability threshold (e.g., 70%≤80%). Using the model 124, the probability increases as a number of triggered alerts in the pattern increases. Accordingly, as the number of triggered alerts in the pattern increases, the model 124 becomes more sensitive to the significance of a predicted next alert 128.

In some embodiments, the output module 120 can determine a severity level associated with the predicted next alert 128 and determine whether the severity level satisfies a severity level threshold (e.g., 7 out of 10). For instance, the output module 120 can display a notification of the speculative occurrence of the predicted next alert 128 to a security analyst 104 for further investigation if the severity level (e.g., 8 out of 10) of the predicted next alert 128 is greater than the severity level threshold (e.g., 8>7). In contrast, the output module 120 can refrain from displaying the notification of the speculative occurrence of the predicted next alert 128 if the severity level (e.g., 6 out of 10) of the next alert is less than or equal to the severity level threshold (e.g., 6≤7).

Consequently, a security analyst 104 can devote his or her valuable time to situations in which there is a reasonable chance of a next alert being triggered and/or in situations in which there may be severe consequences due to a high severity level. Accordingly, the security analyst 104 is not overwhelmed with issues that have little chance of occurrence or that have little to no consequences.

In some implementations, the probability threshold described above can be established based on a severity level of a predicted next alert. That is, a lower probability threshold (e.g., 50%) can be set for a higher severity level alerts (e.g., 7 and above) to ensure investigation by a security analyst, and a higher probability threshold (e.g., 80%) can be set for lower severity level alerts (e.g., 6 and below) to ensure that a security analyst can focus his or her investigative time on the more important issues.

In various examples, device(s) of a security system 102 can include one or more computing devices that operate in a cluster or other grouped configuration to share resources, balance load, increase performance, provide fail-over support or redundancy, or for other purposes. For instance, device(s) of a security system 102 can belong to a variety of classes of devices such as server-type devices, desktop computer-type devices, mobile-type devices, special purpose-type devices, embedded-type devices, and/or wearable-type devices. A client device used by a security analyst 104 can include, but is not limited to, a desktop computer, a game console and/or a gaming device, a tablet computer, a personal data assistant (PDA), a mobile phone/tablet hybrid, a laptop computer, a telecommunication device, a wearable device, a work station, or any other sort of computing device.

A client device can include input/output (I/O) interfaces that enable communications with input/output devices such as user input devices including peripheral input devices (e.g., a keyboard, a mouse, a pen, a voice input device, a touch input device, a gestural input device, and the like) and/or output devices including peripheral output devices (e.g., a display, a printer, audio speakers, a haptic output device, and the like). A client device can also include one or more network interface(s) to enable communications between device(s) over network(s) 108. Such network interface(s) can include one or more network interface controllers (NICs) or other types of transceiver devices to send and receive communications and/or data over a network.

Network(s) 108 can include, for example, public networks such as the Internet, private networks such as an institutional and/or personal intranet, or some combination of private and public networks. Network(s) 108 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 108 can utilize communications protocols, including packet-based and/or datagram-based protocols such as internet protocol (IP), transmission control protocol (TCP), user datagram protocol (UDP), or other types of protocols. Moreover, network(s) 108 can also include a number of devices that facilitate network communications and/or form a hardware basis for the networks, such as switches, routers, gateways, access points, firewalls, base stations, repeaters, backbone devices, and the like.

Figure 2:
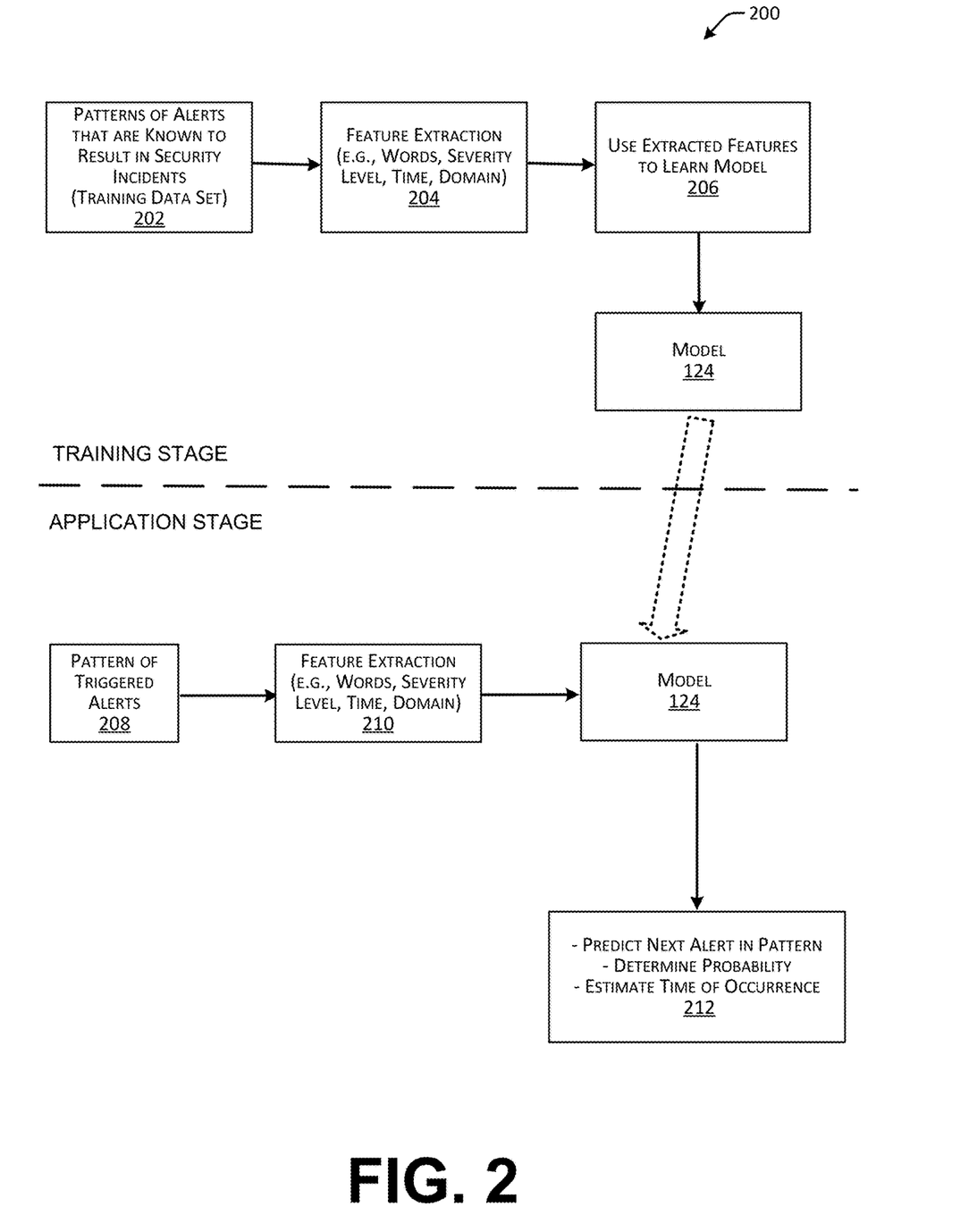
FIG. 2 is a block diagram illustrating a training stage and an application stage for a model used to predict a next alert provided a pattern of triggered alerts associated with a resource or a group of resources.

FIG. 2 is a block diagram 200 illustrating a training stage and an application stage for a model 124 used to predict a next alert provided a pattern of triggered alerts associated with a resource or a group of resources. The model 124 can be any type of predictive model that can be applied to features extracted from a pattern of triggered alerts. Accordingly, the model 124 can use any one of neural networks (e.g., convolutional neural networks, recurrent neural networks such as Long Short-Term Memory, etc.), Naïve Bayes, k-nearest neighbor algorithm, majority classifier, support vector machines, random forests, boosted trees, Classification and Regression Trees (CART), and so on.

During the training stage, the model 124 can be learned by using, as a training data set 202, patterns of alerts that are known to result in security incidents (e.g., patterns and labels stored in the database 126). The next alert determination module 118 performs feature extraction 204 on the information included in the alerts 110 and uses the extracted features to learn the model 124.

The features can include words that describe a type of alert, a severity level associated with the alert, a time at which the alert is triggered, and/or domain information associated with the alert. The domain information can identify a resource that produces the alert, a resource on which the detected action occurs, and/or a domain in which the alert is triggered. In this way, the domain information can be used to group alerts in association with pattern detection.

In various examples, the model 124 can be trained to combine the words used in a pattern of triggered alerts and to map the combined words to a linguistic context associated with a potential security issue. This type of model (e.g., a "doc2vec" model) may use neural networks and/or natural language processing techniques to produce a vector space that includes a vector representation for the words used in an individual pattern of triggered alerts. The vector representations are positioned, in the vector space, so that patterns of detected alerts that are more likely to share common linguistic contexts, associated with the same security issue, are located in close proximity to one another. Consequently, the model can use vector representations that share a linguistic context in order to predict the next alert that is likely to occur. For instance, provided a set of words used to describe a pattern of triggered alerts, the model can determine word (s) that are missing in the linguistic context and predict the next alert based on the missing word(s) (e.g., a word missing in a sentence, words missing in a paragraph, words missing in a phrase, etc.). In some scenarios, the missing word(s) may be word(s) in the linguistic context that come after the set of words used to describe the pattern of triggered alerts. While in other scenarios, the missing word(s) may be word(s) that are interspersed between the set of words used to describe the pattern of triggered alerts.

After the training stage is complete, the model 124 can be used in the application stage to perform the tasks of predicting a next alert in a pattern, determining a probability of the predicted next alert being triggered, and determining an estimated time or time frame at which the predicted next alert is likely to be triggered. That is, provided a pattern of triggered alerts 208 associated with a resource or a group of resources, the next alert determination module 118 implements feature extraction 210 on the pattern of triggered alerts 208 and applies the model 124 in order to predict a next alert in the pattern, as well as determine a probability of the predicted next alert being triggered and estimate a time or time frame at which the predicted next alert is likely to be triggered 212.

Figure 3:
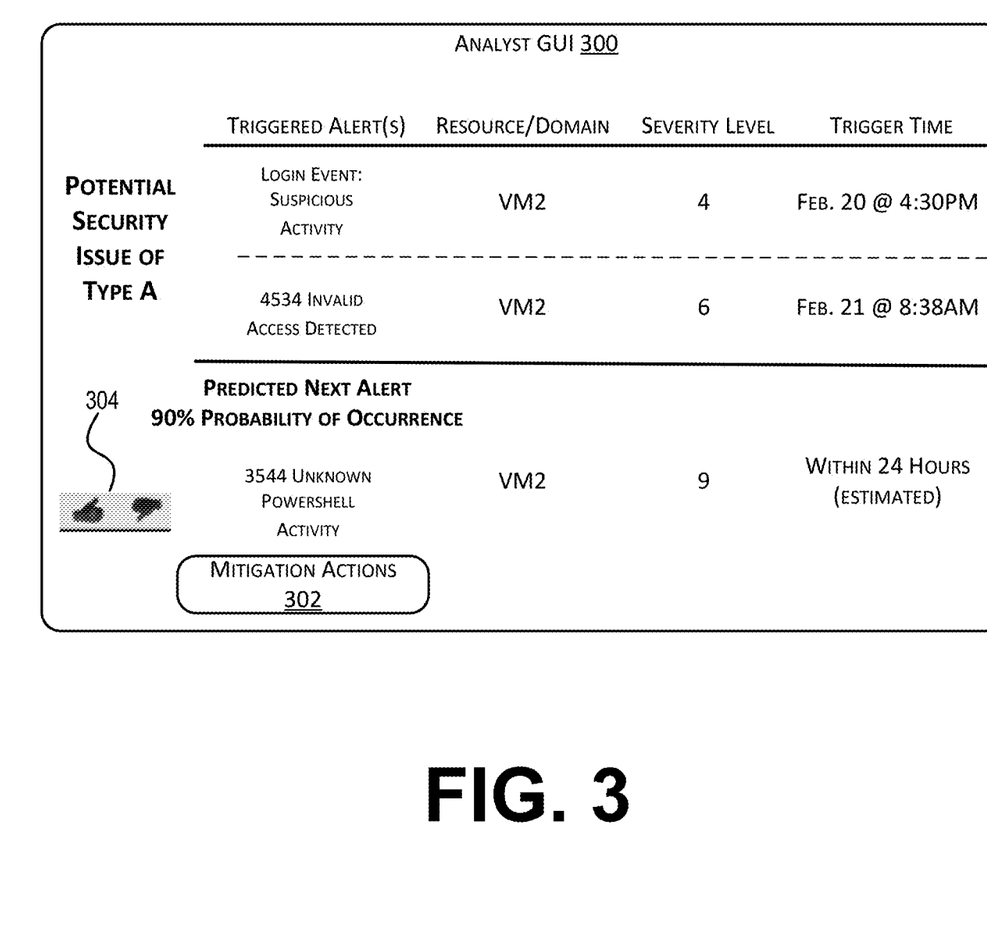
FIG. 3 is an example graphical user interface illustrating information associated with a predicted next alert and a pattern of triggered alerts that can be displayed to a security analyst.

FIG. 3 is an example graphical user interface 300 illustrating information associated with a predicted next alert and a pattern of triggered alerts that can be displayed to a security analyst. As shown in the example graphical user interface 300 of FIG. 3, the triggered alerts that are part of an identified pattern are displayed to the security analyst (e.g., "Login Event: Suspicious Activity" and "4534 Invalid Access Detected"). Information associated with the triggered alerts is also displayed, such as an identification of a resource within which an action that triggered the alert is detected (e.g., "VM2") and/or a domain to which the resource belongs, severity levels associated with the triggered alerts (e.g., "4" and "6"), and/or times at which the alerts were triggered (e.g., "Feb. 20 @ 4:30 PM" and "Feb. 21 @ 8:38 AM").

Additionally, the graphical user interface 300 displays the predicted next alert (e.g., "3544 Unknown Powershell Activity") in the pattern and a probability of the predicted next alert occurring (e.g., "90%"), as determined by the model. Similar to the already triggered alerts, information associated with the predicted next alert can also be displayed, such as an identification of a resource within which an action that triggers the predicted next alert is likely to occur (e.g., "VM2"), a severity level associated with the predicted next alert (e.g., "9"), and/or an estimated time or time frame at which the predicted next alert is likely to trigger (e.g., "Within 24 Hours").

In some examples, the graphical user interface 300 can inform the security analyst of the type of security issue associated with the triggered alerts and the next predicted alert in the pattern (e.g., "Potential Security Issue of Type A"). Moreover, the graphical user interface 300 may be configured to display, and/or provide direct access to (e.g., via a selectable option 302), mitigation actions that can be implemented to mitigate the security issue. This can help the security analyst resolve the security issue if the security analyst, upon reviewing the displayed information and/or performing a deeper investigation, determines it is a real security issue.

In various examples, the graphical user interface 300 can be configured to present an option 304 for the security analyst to provide feedback indicating whether (i) the predicted next alert has been correctly or incorrectly determined to be associated with the pattern of triggered alerts and/or (ii) the predicted next alert and the pattern of triggered alerts amount to a real security issue. For example, upon a cursory review of the displayed information and/or a deeper investigation, a security analyst can provide an indication, via a selection of the thumbs-up option or a selection of the thumbs-down option, of whether the next alert determination module 118 correctly grouped the next predicted alert with the pattern of triggered alerts. Acquiring this feedback enables a supervised learning approach that can improve the model 124 using information that continues to be collected over time.

Figure 4:
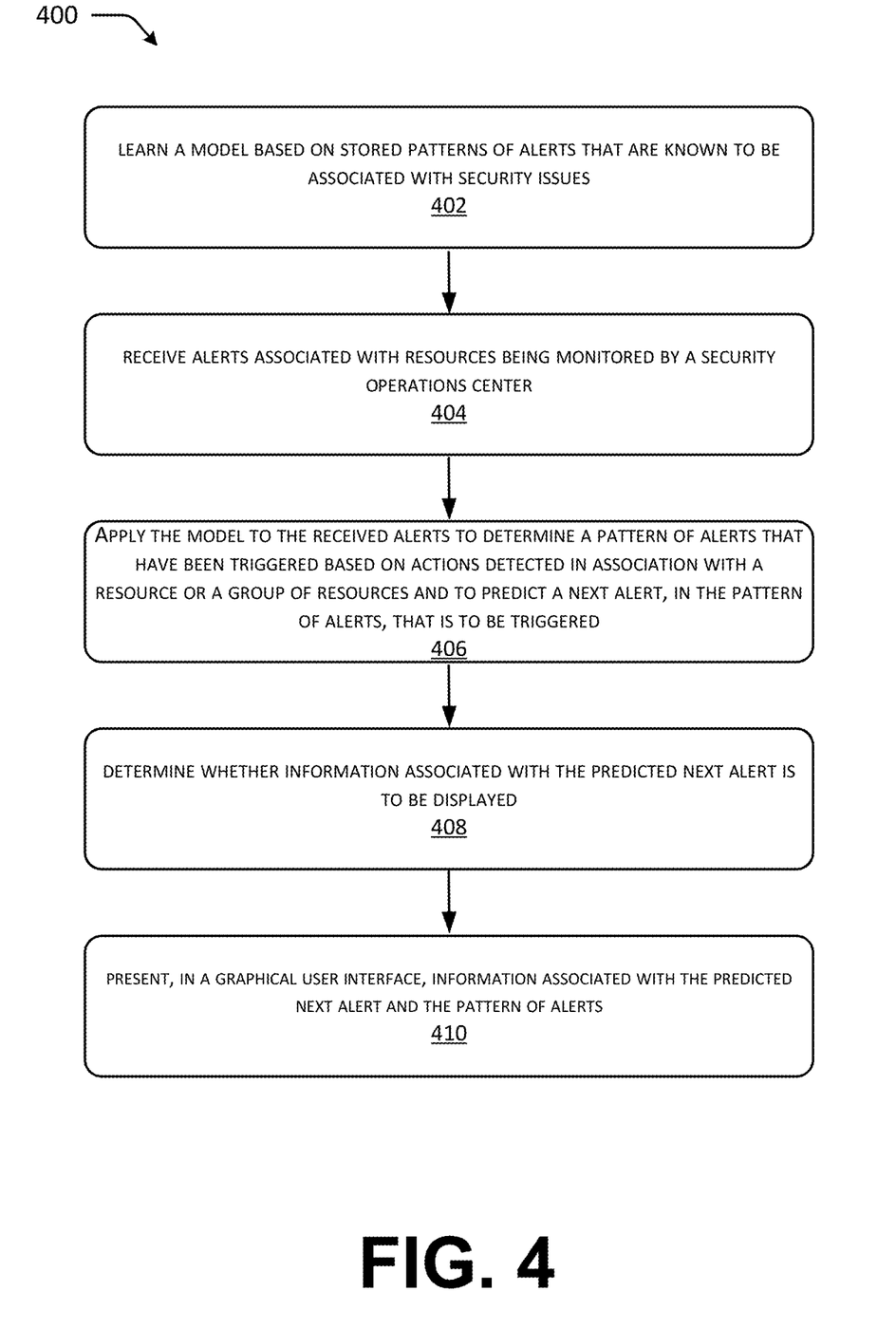
FIG. 4 is a flow diagram of an example method for predicting a next alert provided a pattern of triggered alerts associated with a resource or group of resources being monitored by a security operations center.

FIG. 4 represents an example process in accordance with various examples from the description of FIGS. 1-3. The example operations shown in FIG. 4 can be implemented on or otherwise embodied in one or more device(s) of the security system 102.

The order in which the operations are described is not intended to be construed as a limitation, and any number of the described operations can be combined in any order and/or in parallel to implement each process. Moreover, the operations in FIG. 4 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations.

FIG. 4 is a flow diagram of an example method 400 for predicting a next alert provided a pattern of triggered alerts associated with a resource or group of resources being monitored by a security operations center.

At operation 402, a model is learned based on stored patterns of alerts that are known to be associated with security issues. As described above, the model can be any type of predictive model that can be applied to features extracted from a pattern of triggered alerts that are determined to be associated with a resource or a group of resources. Accordingly, the model can use any one of neural networks (e.g., convolutional neural networks, recurrent neural networks such as Long Short-Term Memory, etc.), Naïve Bayes, k-nearest neighbor algorithm, majority classifier, support vector machines, random forests, boosted trees, Classification and Regression Trees (CART), and so on.

At operation 404, alerts associated with resources being monitored by a security operations center are received over a period of time. An individual alert is triggered based on actions detected in association with a resource or a group of resources.

At operation 406, the model is applied to the received alerts to determine (e.g., identify) a pattern of alerts triggered based on the actions detected in association with the resource or the group of resources and to predict a next alert, in the pattern of alerts, that is to be triggered.

In various examples, at operation 408, it is determined whether information associated with the predicted next alert is to be displayed. For example, a probability threshold and/or a severity threshold, as described above, can be used to determine whether the information should be displayed to a security analyst.

At operation 410, the information associated with the predicted next alert and the pattern of alerts is displayed to a security analyst, e.g., as described above with respect to FIG. 3.

Figure 5:
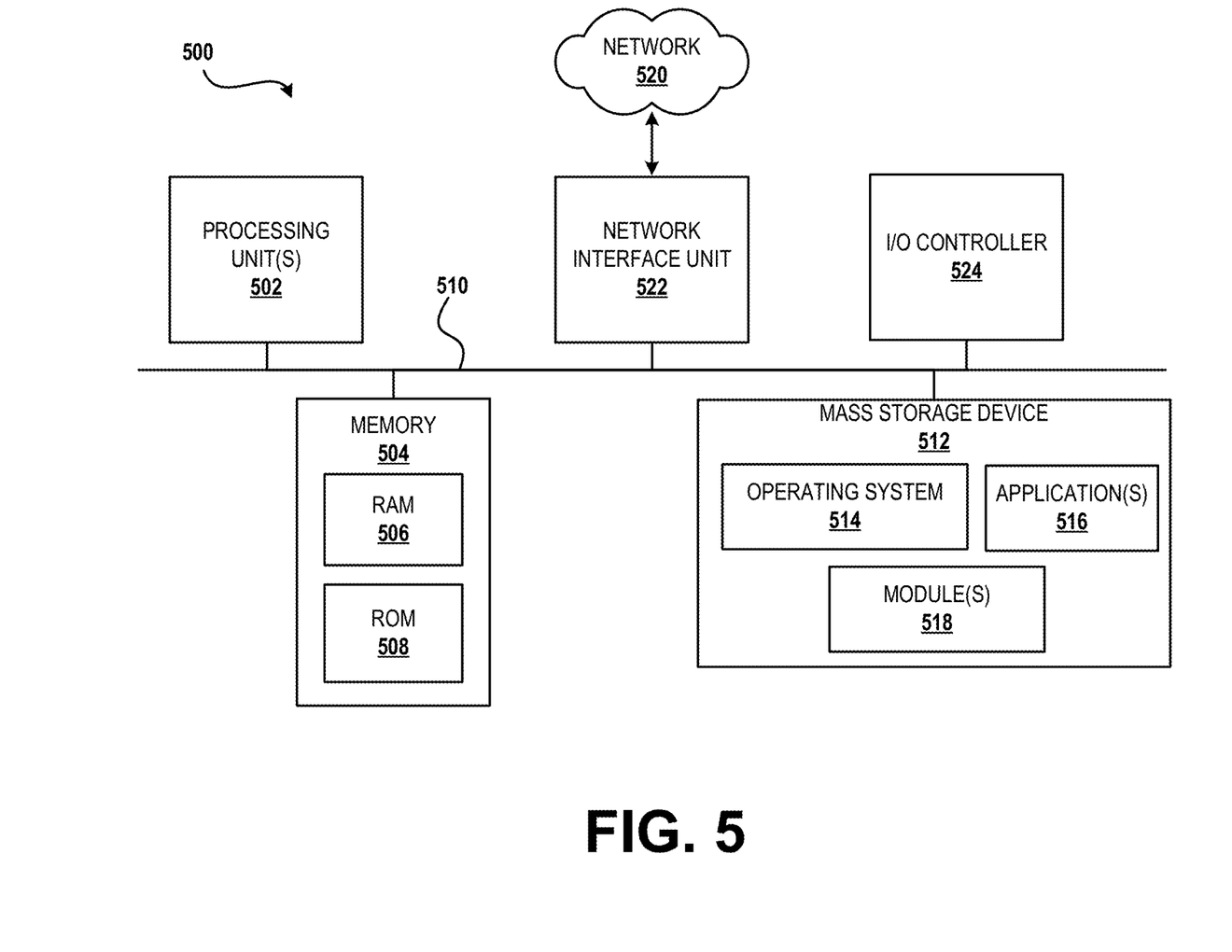
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the security system 102, capable of executing computer instructions (e.g., a module or a program component described herein). The computer architecture 500 illustrated in FIG. 5 includes processing unit(s) 502, a system memory 504, including a random access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518 (e.g., the next alert determination module 118 and the output module 120), and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

Figure 6:
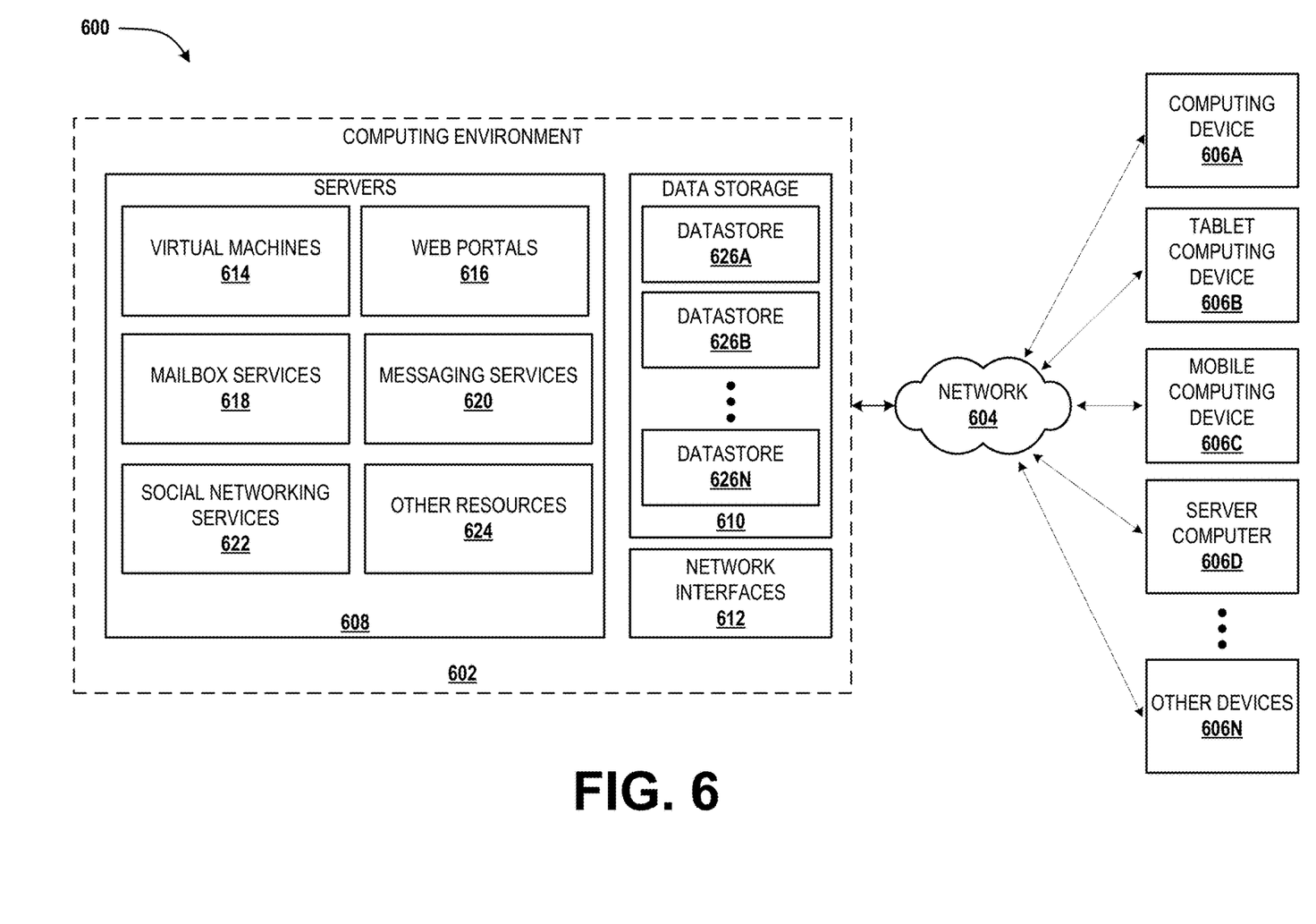
FIG. 6 is a diagram illustrating a distributed computing environment capable of implementing aspects of the techniques and technologies presented herein.

FIG. 6 depicts an illustrative distributed computing environment 600 within which the techniques described herein can be implemented. For example, the distributed computing environment 600 can includes resources and/or groups of resources within which alerts can be triggered. Moreover, the resources and/or groups of resources can be monitored by a security operations center (e.g., the security system 102 in FIG. 1).

Accordingly, the distributed computing environment 600 can include a computing environment 602 operating on, in communication with, or as part of the network 604. The network 604 can include various access networks. One or more client devices 606A-606N (hereinafter referred to collectively and/or generically as "clients 606" and also referred to herein as computing devices 606) can communicate with the computing environment 602 via the network 604. In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, messaging services 620, and/or, social networking services 622. As shown in FIG. 6, the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the servers 608 and/or other data. That is, the datastores 626 also can host or store web page documents, word documents, presentation documents, data structures, algorithms for execution by a recommendation engine, and/or other data utilized by any application program. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

The disclosure presented herein also encompasses the subject matter set forth in the following clauses.

Example Clause A, a system comprising: one or more processing units; and a computer-readable storage medium having computer-executable instructions stored thereupon, which, when executed by the one or more processing units, cause the one or more processing units to: learn a model based on stored patterns of alerts that are known to be associated with security issues; apply the model to determine that individual alerts, in a pattern of alerts, have been triggered based on actions detected in association with a resource or a group of resources; predict, based on application of the model, a next alert that is to be triggered in the pattern of alerts; and present, in a graphical user interface, information associated with the next alert and the pattern of alerts.

Example Clause B, the system of Example Clause A, wherein the information includes a type of malicious activity likely to be associated with the next alert and the pattern of alerts.

Example Clause C, the system of Example Clause A or Example Clause B, wherein: the model determines a probability of the next alert being triggered; and the information includes the probability of the next alert being triggered.

Example Clause D, the system of Example Clause C, wherein the probability of the next alert being triggered increases as a number of alerts in the pattern of alerts increases.

Example Clause E, the system of Example Clause C or Example Clause D, wherein the computer-executable instructions further cause the one or more processing units to: compare the probability of the next alert being triggered to a probability threshold; determine that the probability of the next alert being triggered is greater than the probability threshold; and present, in the graphical user interface, the information associated with the next alert and the pattern of alerts based at least in part on determining that the probability of the next alert being triggered is greater than the probability threshold.

Example Clause F, the system of any one of Example Clauses A through E, wherein: the model determines an estimated time at which the next alert is to be triggered; and the information includes the estimated time at which the next alert is to be triggered.

Example Clause G, the system of any one of Example Clauses A through F, wherein the computer-executable instructions further cause the one or more processing units to: determine that a severity level associated with the next alert is greater than a severity level threshold; and present, in the graphical user interface, the information associated with the next alert and the pattern of alerts based at least in part on determining that the severity level associated with the next alert is greater than the severity level threshold.

Example Clause H, the system of any one of Example Clauses A through G, wherein the computer-executable instructions further cause the one or more processing units to extract features from the individual alerts in the pattern of alerts, wherein: the features include words used to describe the individual alerts; and the model is trained to map the words used to describe the individual alerts to a linguistic context and to predict the next alert based on identifying one or more words in the linguistic context that follow the words used to describe the individual alerts.

Example Clause I, the system of Example Clause H, wherein the model uses neural networks and natural language processing.

Example Clause J, a method comprising: learning, by one or more processing units, a model based on stored patterns of alerts that are known to be associated with security issues; applying the model to determine that individual alerts, in a pattern of alerts, have been triggered based on actions detected in association with a resource or a group of resources; predicting, based on application of the model, a next alert that is to be triggered in the pattern of alerts; and presenting, in a graphical user interface, information associated with the next alert and the pattern of alerts.

Example Clause K, the method of Example Clause J, wherein the information includes a type of malicious activity likely to be associated with the next alert and the pattern of alerts.

Example Clause L, the method of Example Clause J or Example Clause K, wherein: the model determines a probability of the next alert being triggered; and the information includes the probability of the next alert being triggered.

Example Clause M, the method of Example Clause L, wherein the probability of the next alert being triggered increases as a number of alerts in the pattern of alerts increases.

Example Clause N, the method of Example Clause L or Example Clause M, further comprising: comparing the probability of the next alert being triggered to a probability threshold; determining that the probability of the next alert being triggered is greater than the probability threshold; and presenting, in the graphical user interface, the information associated with the next alert and the pattern of alerts based at least in part on determining that the probability of the next alert being triggered is greater than the probability threshold.

Example Clause O, the method of any one of Example Clauses J through N, wherein: the model determines an estimated time at which the next alert is to be triggered; and the information includes the estimated time at which the next alert is to be triggered.

Example Clause P, the method of any one of Example Clauses J through O, further comprising: determining that a severity level associated with the next alert is greater than a severity level threshold; and presenting, in the graphical user interface, the information associated with the next alert and the pattern of alerts based at least in part on determining that the severity level associated with the next alert is greater than the severity level threshold.

Example Clause Q, the method of any one of Example Clauses J through P, further comprising extracting features from the individual alerts in the pattern of alerts, wherein: the features include words used to describe the individual alerts; and the model is trained to map the words used to describe the individual alerts to a linguistic context and to predict the next alert based on identifying one or more words in the linguistic context that follow the words used to describe the individual alerts.

Example Clause R, the method of Example Clause Q, wherein the model uses neural networks and natural language processing.

Example Clause S, a system comprising: one or more processing units; and a computer-readable storage medium having computer-executable instructions stored thereupon, which, when executed by the one or more processing units, cause the one or more processing units to: receive a plurality of alerts associated with a plurality of resources being monitored by a security operations center, wherein an individual alert is triggered based on one or more detected actions that are associated with a potential security issue; apply a model to identify, within the plurality of alerts, a pattern of alerts that are associated with a particular resource or a particular group of resources; predict, based on application of the model, a next alert that is to be triggered in the pattern of alerts; and present, in a graphical user interface, information associated with the next alert and the pattern of alerts, wherein the information includes a probability of the next alert being triggered.

Example Clause T, the system of Example Clause S, wherein the graphical user interface presents an option to provide feedback indicating whether the next alert and the pattern of alerts amount to a real security issue, thereby enabling supervised learning of the model.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different alerts, two different users, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A system comprising:
   one or more processing units; and
   a computer-readable storage medium having computer-executable instructions stored thereupon, which, when executed by the one or more processing units, cause the one or more processing units to:
   learn a model based on a stored pattern of alerts, wherein each alert in the stored pattern of alerts is known to be indictive of a same security issue;
   receive a plurality of alerts generated by an alert monitoring system deployed in association with a resource based on actions detected in association with the resource;
   apply the model to the plurality of alerts received to determine that at least two alerts in the plurality of alerts received comprise at least part of the stored pattern of alerts;
   predict, based on application of the model, a next alert that is to be generated in the stored pattern of alerts after the at least two alerts; and
   present, in a graphical user interface, information associated with the next alert and the stored pattern of alerts.

2. The system of claim 1, wherein the information includes a type of malicious activity likely to be associated with the next alert and the stored pattern of alerts.

3. The system of claim 1, wherein:
   the model determines a probability of the next alert being generated; and
   the information includes the probability of the next alert being generated.

4. The system of claim 3, wherein the probability of the next alert being generated increases as a number of alerts in the stored pattern of alerts increases.

5. The system of claim 3, wherein the computer-executable instructions further cause the one or more processing units to:
   compare the probability of the next alert being generated to a probability threshold;
   determine that the probability of the next alert being generated is greater than the probability threshold; and
   present, in the graphical user interface, the information associated with the next alert and the stored pattern of alerts based at least in part on determining that the probability of the next alert being generated is greater than the probability threshold.

6. The system of claim 1, wherein:
   the model determines an estimated time at which the next alert is to be generated; and
   the information includes the estimated time at which the next alert is to be generated.

7. The system of claim 1, wherein the computer-executable instructions further cause the one or more processing units to:
   determine that a severity level associated with the next alert is greater than a severity level threshold; and
   present, in the graphical user interface, the information associated with the next alert and the stored pattern of alerts based at least in part on determining that the severity level associated with the next alert is greater than the severity level threshold.

8. The system of claim 1, wherein the computer-executable instructions further cause the one or more processing units to extract features from the individual alerts in the stored pattern of alerts, wherein:
   the features include words used to describe individual alerts; and
   the model is trained to map the words used to describe the individual alerts to a linguistic context and to predict the next alert based on identifying one or more words in the linguistic context that follow the words used to describe the individual alerts.

9. The system of claim 8, wherein the model uses neural networks and natural language processing.

10. A method comprising:
    learning, by one or more processing units, a model based on a stored pattern of alerts, wherein each alert in the stored pattern of alerts is known to be associated with a same security issue;
    receiving a plurality of alerts generated by an alert monitoring system deployed in association with a resource based on actions detected in association with the resource;
    applying the model to the plurality of alerts received to determine that at least two alerts in the plurality of alerts received comprise at least part of the stored pattern of alerts;
    predicting, based on application of the model, a next alert that is to be generated in the stored pattern of alerts after the at least two alerts; and
    presenting, in a graphical user interface, information associated with the next alert and the stored pattern of alerts.

11. The method of claim 10, wherein the information includes a type of malicious activity likely to be associated with the next alert and the stored pattern of alerts.

12. The method of claim 10, wherein:
    the model determines a probability of the next alert being generated; and
    the information includes the probability of the next alert being generated.

13. The method of claim 12, wherein the probability of the next alert being generated increases as a number of alerts in the stored pattern of alerts increases.

14. The method of claim 12, further comprising:
    comparing the probability of the next alert being generated to a probability threshold;
    determining that the probability of the next alert being generated is greater than the probability threshold; and
    presenting, in the graphical user interface, the information associated with the next alert and the stored pattern of alerts based at least in part on determining that the probability of the next alert being generated is greater than the probability threshold.

15. The method of claim 10, wherein:
   the model determines an estimated time at which the next alert is to be generated; and
   the information includes the estimated time at which the next alert is to be generated.

16. The method of claim 10, further comprising:
   determining that a severity level associated with the next alert is greater than a severity level threshold; and
   presenting, in the graphical user interface, the information associated with the next alert and the stored pattern of alerts based at least in part on determining that the severity level associated with the next alert is greater than the severity level threshold.

17. The method of claim 10, further comprising extracting features from the individual alerts in the stored pattern of alerts, wherein:
   the features include words used to describe individual alerts; and
   the model is trained to map the words used to describe the individual alerts to a linguistic context and to predict the next alert based on identifying one or more words in the linguistic context that follow the words used to describe the individual alerts.

18. The method of claim 17, wherein the model uses neural networks and natural language processing.

19. A system comprising:
   one or more processing units; and
   a computer-readable storage medium having computer-executable instructions stored thereupon, which, when executed by the one or more processing units, cause the one or more processing units to:
      receive a plurality of alerts associated with a plurality of resources being monitored by a security operations center, wherein an individual alert is generated by an alert monitoring system deployed in association with a particular resource or a particular group of resources based on one or more detected actions;
      apply a model to identify, within the plurality of alerts, at least two alerts are in a stored pattern of alerts that indicates a security issue;
      predict, based on application of the model, a next alert that is to be generated in the stored pattern of alerts after the at least two alerts; and
      present, in a graphical user interface, information associated with the next alert and the pattern of alerts, wherein the information includes a probability of the next alert being generated.

20. The system of claim 19, wherein the graphical user interface presents an option to provide feedback indicating whether the next alert and the stored pattern of alerts amount to a real security issue, thereby enabling supervised learning of the model.

* * * * *